(No Model.)  2 Sheets—Sheet 1.

G. H. POOR.
AUTOMATIC CAR BRAKE.

No. 348,234. Patented Aug. 31, 1886.

Witnesses
G. A. Tauberschmidt
F. P. Metzger

Inventor
George H. Poor
by F. W. Ritter Jr.
Atty.

N. PETERS, Photo-Lithographer, Washington, D. C.

(No Model.) 2 Sheets—Sheet 2.

G. H. POOR.
AUTOMATIC CAR BRAKE.

No. 348,234. Patented Aug. 31, 1886.

UNITED STATES PATENT OFFICE.

GEORGE H. POOR, OF ST. LOUIS, MISSOURI, ASSIGNOR TO THE AMERICAN BRAKE COMPANY, OF SAME PLACE.

AUTOMATIC CAR-BRAKE.

SPECIFICATION forming part of Letters Patent No. 348,234, dated August 31, 1886.

Application filed January 20, 1886. Serial No. 189,187. (No model.)

*To all whom it may concern:*

Be it known that I, GEORGE H. POOR, a citizen of the United States, residing at St. Louis, in the State of Missouri, have invented certain new and useful Improvements in Automatic Brakes; and I hereby declare the following to be a full, clear, and exact description of the same, reference being had to the accompanying drawings, wherein—

Figure 1:
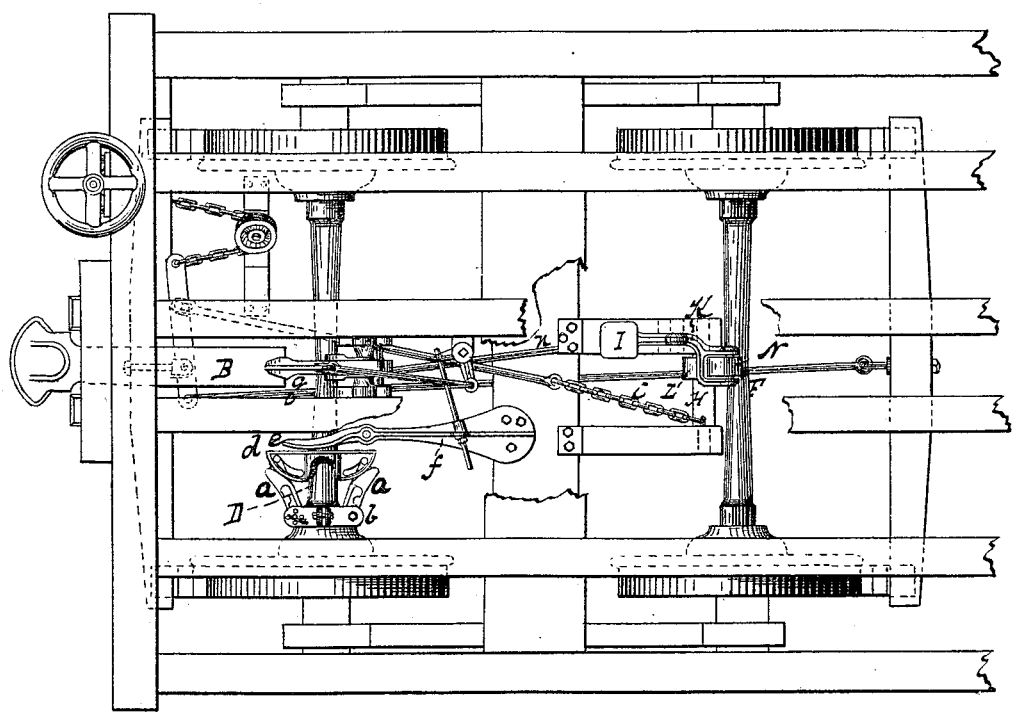
Figure 2:
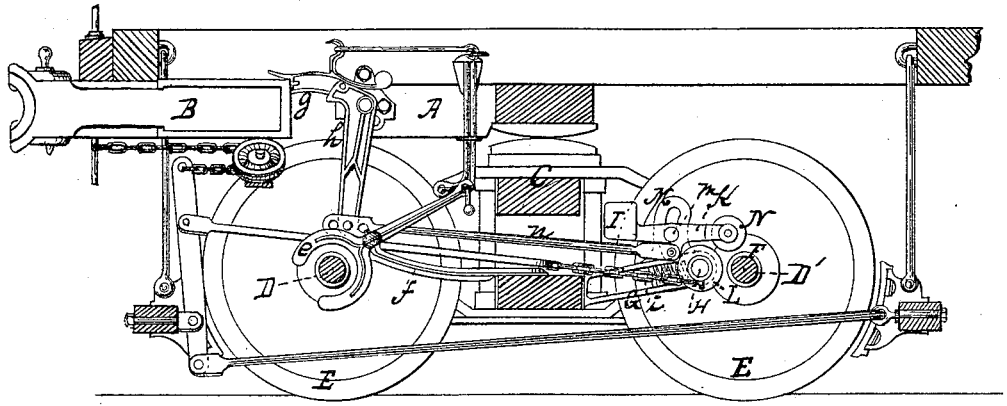
Figure 3:
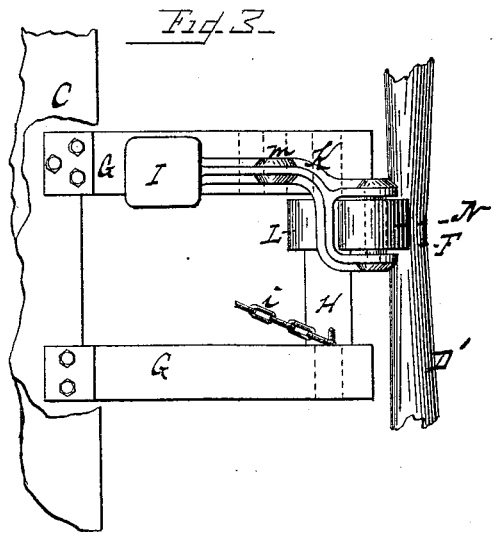
Figure 4:
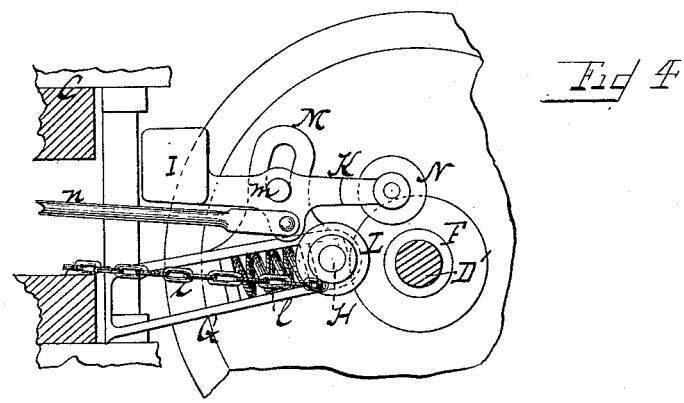
Figure 5:
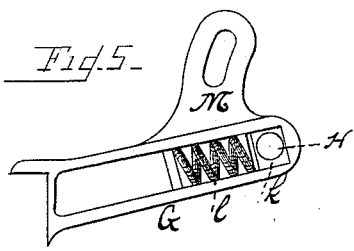

Figure 1 is a plan view of a truck having applied thereto devices embodying my invention. Fig. 2 is a longitudinal vertical section on the line $x\ x$, Fig. 1, showing the devices in elevation. Fig. 3 is an enlarged detail plan of a car-axle, friction-wheel thereon, friction-clutch, and friction power-pulley. Fig. 4 is an enlarged detail side view of the same. Fig. 5 is a detached view of the bracket which carries or supports the power-pulley and the guide of the floating friction wheel or clutch.

Like letters refer to like parts wherever they occur.

My present invention relates to the construction of automatic car-brakes, as is especially adapted to such as are applied by means of a friction-clutch, belt, or power derived from the axle.

The trouble commonly experienced with brakes which take the power from the axle is that the power becomes excessive, and has a tendency to cause the brakes to lock the wheels and make them slide, and also to put unnecessary wear and strain on the brake-levers. There are other objections; but these alone have heretofore been so insurmountable that friction-brakes, though possessing many good points, have never come into use or been considered practical, except, perhaps for hand-braking.

The object of my present invention is to provide means for controlling the power of friction-brake mechanism, as well as automatically applying the same; and to this end, generally stated, it consists, first, in combining with the friction driving-pulley, which may be the axle-shaft itself or a friction-pulley thereon, and with the friction driven pulley or friction-pulleys, which directly controls the brake system, and a third or interposed floating transmitting friction-pulley, which latter is controlled directly from the governor; secondly, in providing both the driven friction-pulley and the intermediate or transmitting friction-pulley with relief mechanism, which shall permit them to yield and change their relative positions to each other and to the driving-pulley when the power becomes excessive or beyond that which it is desirable to apply to the brakes. There are other and minor features, which will hereinafter more fully appear.

I will now proceed to describe my invention more specifically, so that others skilled in the art to which it appertains may apply the same.

In the drawings, A indicates the draw-timbers, B the draw-head, C the truck-bolsters, D the axle, and E the wheels, of any approved form of car to which it is desirable to apply brake mechanism. If the power is to be applied through the draw-bar, it will of course be movable.

If the governor is the means for controlling the application of the power, it may be in the nature of electrical apparatus, or it may be a centrifugal governor.

I prefer a centrifugal governor, and generally employ that shown in the drawings, consisting of the centrifugal arms or weights $a$, pivoted on a collar, $b$, clamped to and moving with the axle D, and connected with a sliding disk, $d$, which operates a fork, $e$, pivoted on a bracket, $f$, supported by the truck. The bifurcation of the fork receives the axle, and its opposite end is connected with a counterweighted latch, $g$, pivoted on the power-lever $h$, which has it fulcrum and is arranged in rear of the movable draw-bar.

I do not herein claim the specific mechanism thus far described, as it forms part of a prior patent to me, (No. 300,122, June 10, 1884;) neither do I limit myself to such specific mechanism. I use it for purposes of illustration, because I deem it the best and most practicable at present known.

Upon the axle D', or other appropriate source of power, is secured a friction or driving pulley, F, and in a suitable bracket, G, which may be supported by the truck, is journaled a shaft, H, provided with a friction-pulley, L. Attached to the shaft H and connecting it with the pull-rod, which leads to the brake-levers, is a chain or other suitable flexible connection, i, which can be wound around the shaft H, and thus apply the power to the brakes. The journal-bearing has interposed between it and its seat or support a spring, and the construction I prefer is to journal the shaft H in sliding boxes k, and insert between the box and its support the helical spring l. The next and most vital point is to interpose between the friction driver-pulley and the driven friction-pulley, which transmits the power to the brake, a friction-pulley which is adapted to transmit only so much of the power as is required to operate the brakes, and if the devices have a means of varying the power transmitted, or, in other words, can be set to any given power, so much the better.

The devices shown, and which I prefer, constitute a friction-pulley with floating fulcrum, and are constructed as follows: K indicates a lever having a floating fulcrum, m, which is movable in a guide or guides, M, supported, preferably, on the bracket G, which carries the driven friction-pulley L and the shaft H, and said guides are formed in the arc of a circle whose center is the center of the axle. One arm of the floating lever K is counterweighted, as at I, and said counter-weight, which is the means here used of controlling the amount of power to be applied to the brakes, may be fixed when the required power is to be fixed, or may be adjustable when it is desirable to vary the power. As it is on the same principle as the scale-beam, it has not been deemed necessary to illustrate it. The opposite arm of the floating lever K carries a friction-wheel, N, for transmitting the power from the driver-pulley to the driven pulley, and at or near the fulcrum m is a lug on the lever or crank arm, by means of which and a suitable rod, n, or chain the power-lever h is connected with the floating lever K.

The devices, being such as to embody the principle hereinbefore enunciated, will operate as follows: The governor, whether the same be electrical or centrifugal, will, when the train is at speed, establish the connection between the source of power and the power-lever which actuates the brake system. This will bring into action the friction-pulley N, and the power is transmitted from the source of power (in the present instance the axle) to the driven pulley L and its shaft H, through intermediate floating or transmitting friction wheel, M, and winds up chain i, thus applying the brakes. If the power exceeds that which the friction-pulley is gaged or adjusted to transmit, the floating fulcrum m of the clutch moves off or up and corrects the difficulty. This construction also relieves the devices from the effect of heavy shocks, while the sliding spring-bearings of the shaft H have a similar effect.

It is evident that the axle itself might be the friction driving-pulley or friction-driver, and I wish it to be understood that the same comes within the scope of my invention. It is also evident that a spring might take the place of a weight, as at I, and, bearing on the arm of the floating lever K, produce what I term a "counterweighted friction-clutch," and I also consider the same as within the scope of the claims, as hereinafter made.

Having thus set forth the nature, operation, and advantages of my invention, what I claim, and desire to secure by Letters Patent, is—

1. In car-brakes, the combination of a friction driver-pulley on the axle, a friction driven pulley which controls the brakes and has yielding bearings, an interposed power-transmitting friction-pulley, also provided with yielding bearings, and a governor for controlling the latter pulley, substantially as and for the purposes specified.

2. In an automatic brake system, the combination, with the power-lever, of a friction driving or power pulley, a friction driven pulley for transmitting the power to the brake-levers, an interposed friction-pulley, and a governor for controlling the connection of the friction-pulley with the driving-pulley, substantially as and for the purposes specified.

3. In an automatic brake system, the combination, with the power-lever, of a friction driving or power pulley, a driven pulley for transmitting the power to the brake-levers, an interposed floating friction-pulley, and a governor for controlling the connection of the friction-pulley with the driving-pulley, substantially as and for the purposes specified.

4. In an automatic brake system, the combination, with a movable draw-bar, a power-lever, and a detent for connecting the two, of a governor for actuating the detent, a floating friction-pulley, a friction driving-pulley on the axle, and a friction driven pulley connected with the brakes, substantially as and for the purposes specified.

5. In an automatic brake system, the combination, with the power-lever, of a counterweighted floating lever, a friction-pulley mounted on the floating lever, a friction driving-pulley on the axle, a friction driven pulley having yielding bearings and connected to the brakes, substantially as and for the purposes specified.

6. In an automatic brake system, the combination, with the power-lever, of a floating lever having at one end an adjustable counterweight and at the opposite end a friction-pulley, a curved fulcrum-guide for the floating lever, a friction driving-pulley on the axle, and the brake-levers connected to the shaft of the driven pulley, substantially as and for the purposes specified.

7. In an automatic brake system, the combination of a power-lever, a friction-driver, a friction driven shaft, a counterweighted friction-pulley for connecting the driving and driven shaft, and the brakes with suitable intermediate connections, substantially as and for the purposes specified.

In testimony whereof I affix my signature, in presence of two witnesses, this 2d day of January, 1886.

GEORGE H. POOR.

Witnesses:
HENRY ALVAHLED,
E. B. LEIGH.